Aug. 30, 1932.  V. R. DESPARD  1,875,224
ELECTRIC WIRING APPARATUS
Filed July 31, 1931  4 Sheets-Sheet 1
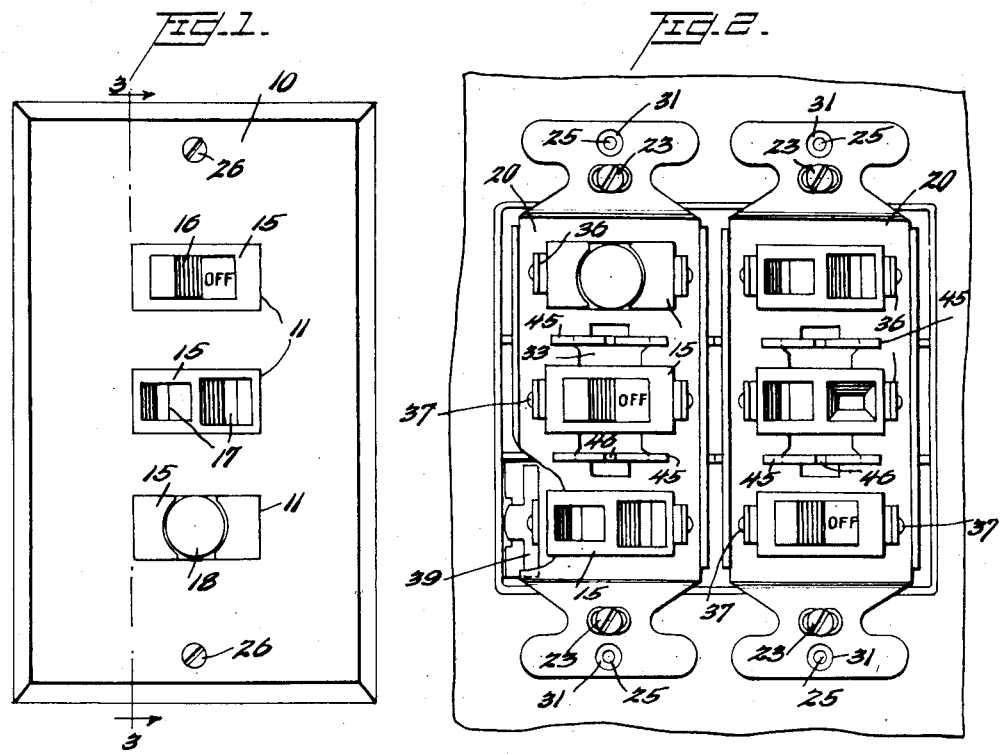
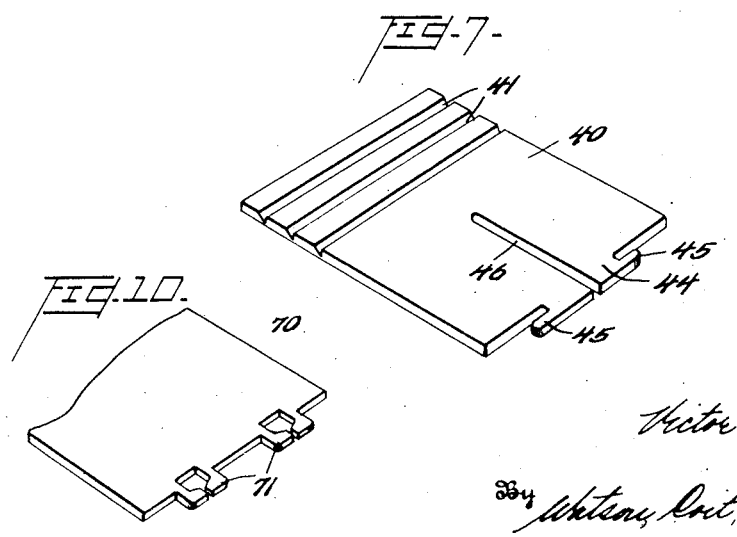

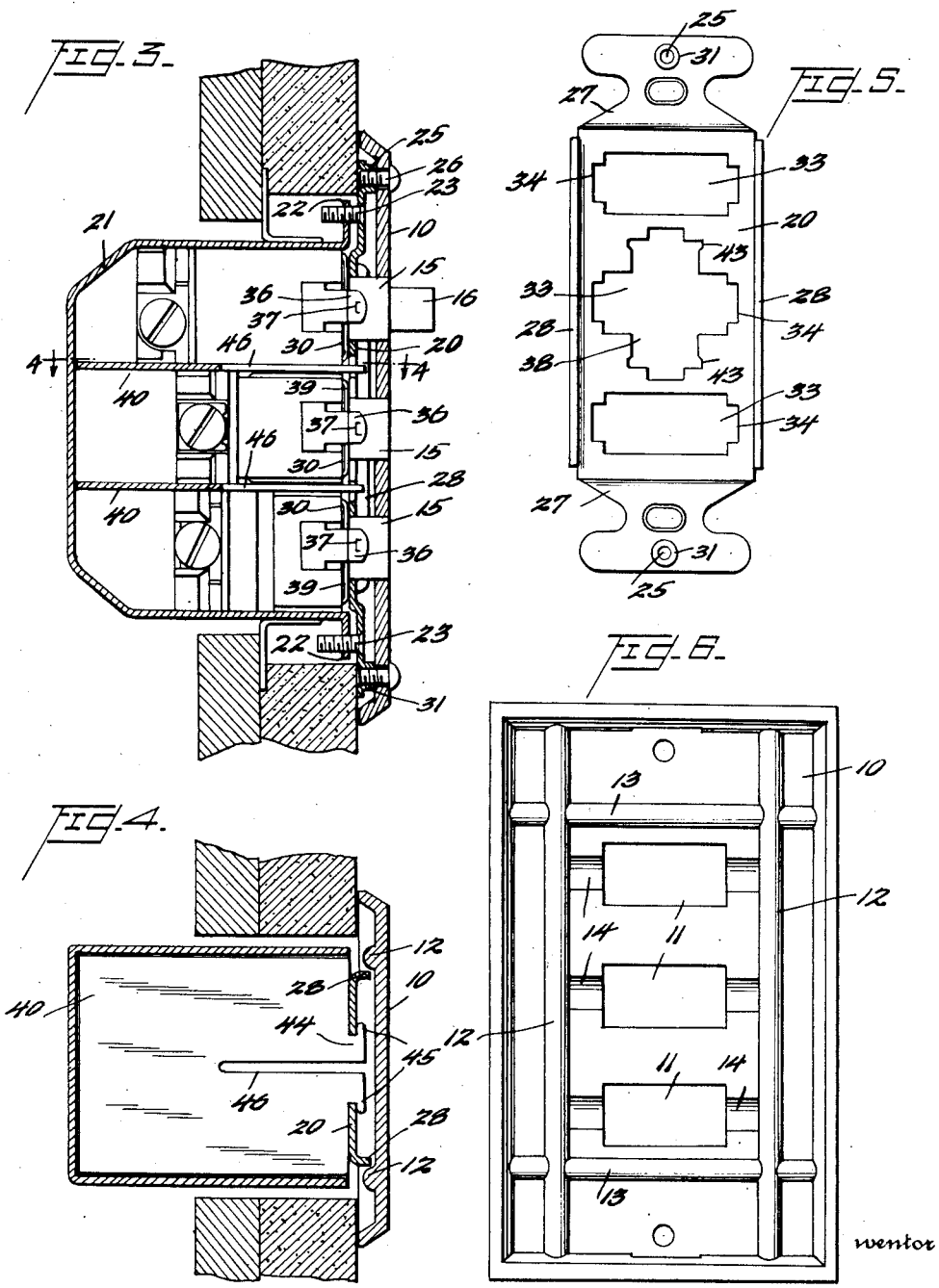

Aug. 30, 1932.  V. R. DESPARD  1,875,224
ELECTRIC WIRING APPARATUS
Filed July 31, 1931   4 Sheets-Sheet 3
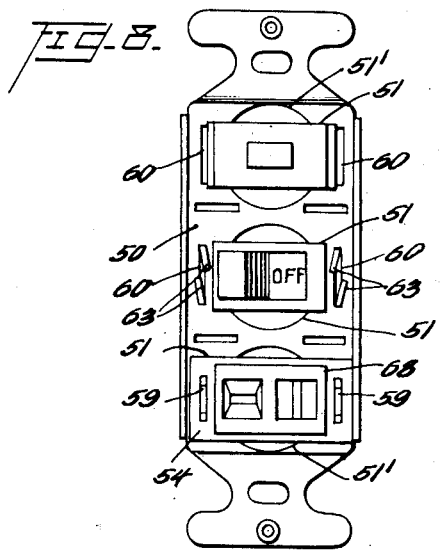
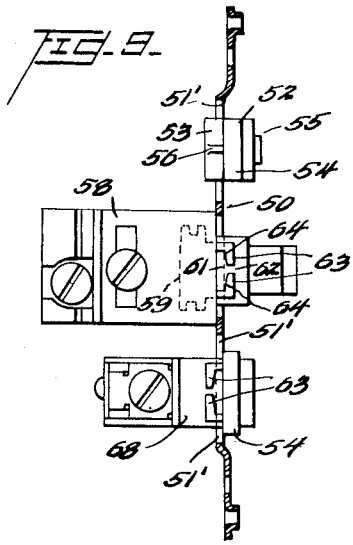
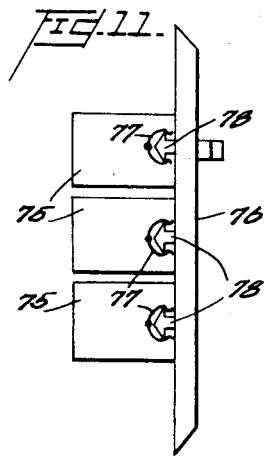
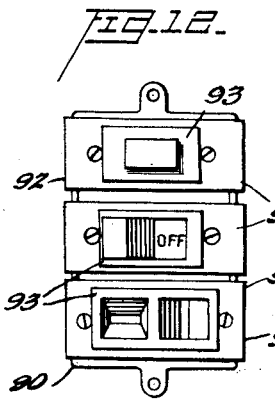
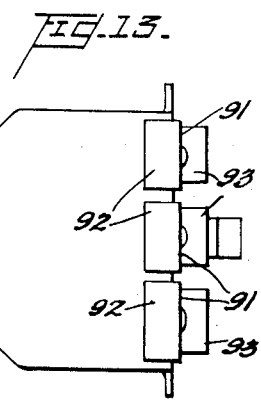
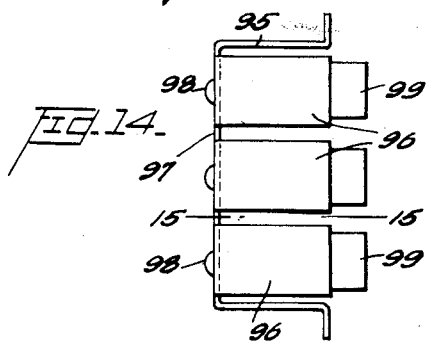
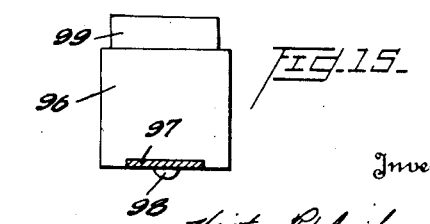

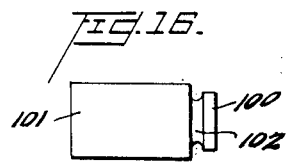
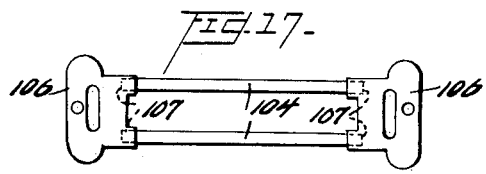
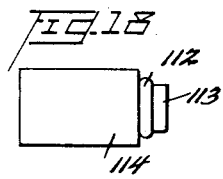
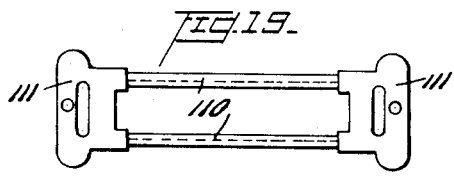
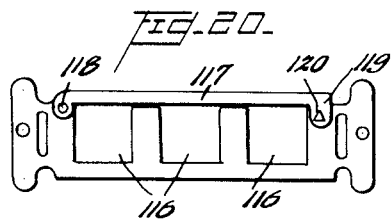
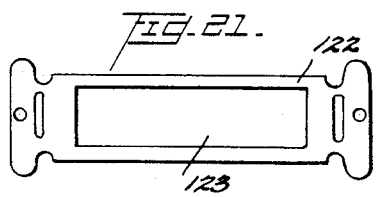
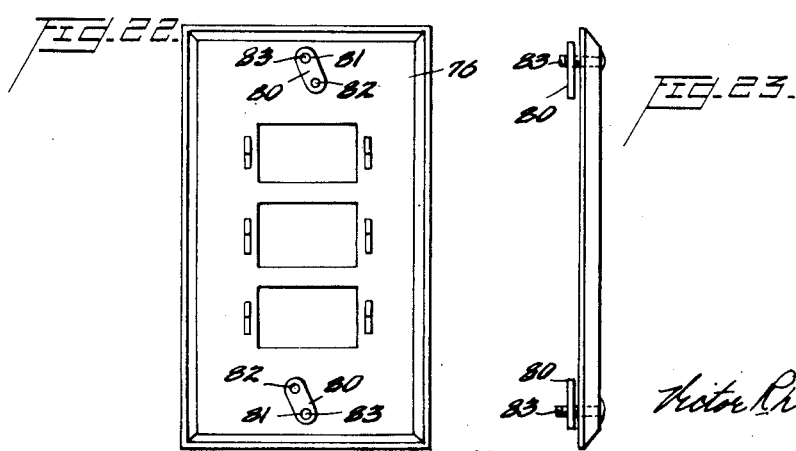

Patented Aug. 30, 1932

1,875,224

UNITED STATES PATENT OFFICE

VICTOR R. DESPARD, OF SYRACUSE, NEW YORK, ASSIGNOR TO PASS & SEYMOUR, INC., OF SYRACUSE, NEW YORK, A CORPORATION OF NEW YORK

ELECTRIC WIRING APPARATUS

Application filed July 31, 1931. Serial No. 554,323.

REISSUED

This invention relates to apparatus for electric wiring for houses and buildings, and more particularly to the terminal and switching apparatus as applied in walls, base boards, and the like and mounted in outlet boxes, the outer faces of which are covered with wall plates.

It is a general object of the present invention to provide novel and improved apparatus of the type set forth above.

More particularly it is an object of the invention to provide electric wiring apparatus wherein a plurality of wiring devices can be arranged in the space heretofore allotted to a single device and in which interchangeability of the devices provides for ready assembly of any desired combination of devices in a single outlet box.

One of the important features of the present invention resides in the provision of electric wiring devices of various types which are less than single gang size and can be mounted singly or in multiple behind wall plates in which they are interchangeable as regards position and function.

Another feature of the invention resides in the provision of a wall plate of the single gang size provided with one or more uniform openings adapted to each receive in cooperation therewith a wiring device of which a plurality of types are provided for various purposes and which can be assembled in any desired combination and interchangeably behind the plate.

Another feature of the invention consists in the provision of supporting means whereby a plurality of wiring devices may be mounted behind a single gang plate and accurately positioned and spaced in respect to the uniform openings therein.

Still another important feature of the invention resides in the provision of a mounting bridge which is adapted to be extended longitudinally of a single gang outlet box and is arranged to carry one or more wiring devices properly spaced behind a wall plate having uniform openings therein and in which the bridge is provided with means to cooperate with portions of the wiring devices for holding them in position in the bridge.

A further important feature of the invention resides in the provision of a bridge to span the length of a single gang outlet box and adapted to support interchangeably a plurality of wiring devices together with removable separating means which divide the box into compartments, each housing a single one of the wiring devices.

Other objects and features of the invention such as the construction, shape, and manner of mounting the various wiring devices, the construction of the bridge, the means for attaching the separators and the wiring devices to the bridge as well as details of the face plate and its mounting and other parts which will be more clearly set forth hereinafter will be evident to those skilled in the electrical wiring art from a consideration of the accompanying drawings and following specification wherein are disclosed several exemplary embodiments of the invention with the understanding, however, that these various embodiments or parts thereof may be assembled and rearranged to form new combinations such as fall within the scope of the appended claims without departing from the spirit of the invention.

In said drawings:

Figure 1 is a front elevation of a wall plate with three wiring devices assembled behind and through it;

Figure 2 is a face view of a two gang outlet box having two bridges constructed according to the present invention mounted thereon and each supporting an assortment of wiring devices in readiness to receive the two gang wall plate;

Figure 3 is a sectional view taken on line 3—3 of Figure 1;

Figure 4 is a sectional view at right angles to that of Figure 3 and taken on line 4—4 of Figure 3 and showing in elevation a separator carried on the bridge member;

Figure 5 is a face view of one form of bridge;

Figure 6 is a back view of a wall plate of single gang size arranged to receive three wiring devices;

Figure 7 is a perspective view of one of the separators;

Figure 8 is a face view of another form of bridge having mounted therein modified wiring devices;

Figure 9 is a center sectional view of the sub-assembly of Figure 8 showing the devices in elevation;

Figure 10 is a perspective view of a portion of a separator of the type for use with the bridge of Figure 8;

Figure 11 is a side elevational view of a wall plate having wiring devices attached directly thereto without the use of a bridge;

Figure 12 is a face view of an outlet box showing three wiring devices each mounted thereon by means of an individual transverse bridge;

Figure 13 is a side elevational view of the assembly of Figure 12;

Figure 14 shows an assembly of bridge and wiring devices wherein the bridge has a drop center and passes beneath the devices;

Figure 15 is a transverse sectional view on line 15—15 of Figure 14;

Figure 16 is a side elevational view of a wiring device for association with a further form of bridge;

Figure 17 shows in plan view a bridge for use with wiring devices as shown in Figure 16;

Figure 18 is a view similar to Figure 16 for a slightly different form of bridge;

Figure 19 is a view similar to Figure 17 of a form of bridge for use with the devices of Figure 18;

Figure 20 is a face view of a bridge having a hinged side for ease in assembling wiring devices therein;

Figure 21 is a face view of a further form of bridge having a single elongated opening for receiving a plurality of wiring devices;

Figure 22 is a rear elevational view of a wall plate having mounted thereon adjusting devices to permit the plate to be properly positioned on the wall irrespective of slight irregularities in the mounting of the outlet box; and Figure 23 is a side elevational view of the assembly of Figure 22.

When placing wiring devices for walls, base boards, and the like in homes, offices, and other buildings it has heretofore been the custom to mount each device such, for instance, as a switch, convenience outlet, pilot light, etc., in a single outlet box or at least in the space of a single outlet box, or where several devices were to be mounted in a group a larger size box was used to receive these devices. The outlet box adapted to receive a single such device has by usage come to be known as a "single gang" box and likewise those for two devices "two gang boxes", etc. so that the expression "one gang", "two gang", "three gang" etc. designates clearly to those skilled in the art the size of the box and the cooperating parts as, for instance, the wall plates.

There have been some attempts to combine several units in the space of a single gang box but in every case these assemblies were all formed integrally and in preconceived combinations for which a special wall plate was required. In order to make up a desired and special combination it has been necessary to resort to the expedient of using the space of a single gang box for each element of the combination and where a number of elements were desired the apparatus became exceedingly cumbersome and certainly did not add to the ornamentation of the room owing to the large size of the wall plate.

In accordance with the present invention there are provided means for mounting one, two, or three wiring devices in a single gang box and behind a single gang plate, which plate may be provided with three or less uniform openings. These devices are provided with uniform parts to cooperate with the openings in the plates and are arranged with mounting means so that they can be interchangeably secured behind the openings in the plates whereby it is possible to make up any desired combination of three units in a single gang box and multiples of these in two and three gang boxes by the use of standard parts comprising multiple opening plates and a quantity of wiring devices.

With this arrangement the stock required to be carried by a jobber or contractor is reduced to about one-sixth of the amount heretofore required to be carried while permitting a greater flexibility of combinations. In fact several hundred combinations are possible with but less than twenty items for their accomplishment. The economy in manufacturing so few items is apparent. The consumer benefits in his wiring costs and in the appearance of the visible outlets. In most cases, with these interchangeable devices, the installation of a single gang box is all that is necessary whereas now two or more gangs have to be installed to provide similar combinations, requiring more wall space, more expensive multiple gang plates and boxes, and more labor.

The present invention is feasible largely by virtue of the unique construction of the individual units whereby they are sufficiently small so that three can be assembled in a single gang box and by virtue of the novel means for supporting and mounting these units in proper position and spacing for association with the openings in the wall plate.

Wherever in the specification and claims the expression "one gang" or a similar expression is used it is intended to refer to what is commonly known by that designation. The expression "wiring device" refers to any unit intended for mounting in an outlet box behind and/or through a wall plate and includes blanks for closing unused openings in the plate.

Referring now to the drawings there is shown in Figure 1 a wall plate 10 which may be of more or less conventional style, preferably formed of molded insulating material such as one of the well known phenol condensation products and having a plurality of openings or ports 11 therein all of the same size and shape and sized and spaced substantially as found in connection with plates for multiple unit toggle or tumbler switches, although this sizing and spacing of the openings is not necessary. The invention is predicated only on the uniformity of size of the openings so that interchangeability of all of the devices is possible.

As seen in Figure 6 the rear of the wall plate 10 is preferably reenforced by vertical ribs 12, horizontal ribs 13, and has shallow channels 14 leading to the openings or ports 11. It is preferred to have the openings provided with straight sides passing through the plates at right angles to the face thereof in order to snugly receive the elongated necks 15 on the wiring devices which cooperate therewith.

As seen in Figure 1 the upper device is a toggle switch having the operating handle 16, the middle device is a convenience outlet provided with the standard spaced slots 17 for the reception of the blades of a standard cap or plug and the lower device is a pilot light having the lamp 18 arranged with or without a jewel as desired. This jewel as known to the industry, is a piece of red glass, molded or cut to fit into an opening in a switch plate.

It is evident that from the interchangeability previously mentioned that combinations can be made up consisting of all switches, or convenience outlets, combinations of these two, or in fact any combination for which the wiring devices are available and it is contemplated that they be made, in addition to the devices heretofore recited, in radio outlets, telephone outlets, push buttons, cord outlets, and the like as well as in blanks which can be used to close an opening in a plate which may be reserved for future use.

It is clear that where but a single device is required a plate having but a single opening will be used and where two devices are required the plate having only the upper and lower openings may be used, but since the necks of the units fill the openings and are flush with the face of the plate, it can be seen that a three opening plate will be all that is necessary since the unused openings can be filled with blanks without detriment to its appearance and will provide ready means for additional units when desired. Where more than three devices are required a plate to cover a multiple gang box is used and the openings therein are spaced as desired for the various combinations.

As seen in Figures 2 and 3 each of the wiring devices, which are not necessarily of the same size or shape, is secured to or carried by a bridge member 20 which extends along the center of the single gang box 21 as seen in Figure 3 or at one side of a two gang box as shown in Figure 2, and is secured to the ears 22 thereon by means of screws 23 passing through slots in the bridge in substantially the same manner as is a single unit of the old style secured to an outlet box. In the present instance, however, owing to the substantially complete use of the intermediate portions of the bridge the screws for attaching the wall plate are received in threaded openings 25 in bosses 31 in the plaster ears on the bridge beyond the slots for receiving the screws 23. The arrangement of the screws 26 for holding the wall plate in position, is clearly seen in Figure 3.

The bridge is made from a stamping of heavy sheet metal as seen in Figure 5 and in addition to the end members 27 it is provided with the up-turned border ribs 28 which materially strengthen the bridge against bending even with the cut outs for the wiring devices which are provided therein. The center portion of the bridge may be pressed slightly below the ends 27 thereof so that when mounted it stands a distance beneath and parallel to the back of the face plate as seen in Figure 3.

Each of the wiring devices as previously mentioned is provided with an elongated neck 15 of uniform size and of such shape as to snugly fit the openings 11 in the wall plate. In the modification shown in Figures 1 to 9 inclusive these necks are of uniform length, which length is such that when the shoulder 30 at the bottom of the neck abuts the underside of the bridge the end of the neck is flush with the outer face of the wall plate. This wall plate is properly spaced from the shoulder to ensure this by causing the plaster ears of the bridge to rest on the wall as shown in Figure 3 and then drawing the wall plate down against the plaster by its screws 26 as shown and thus uniformity of mounting is ensured. The bridge can be spaced toward or from the edges of the outlet box in the customary manner as by placing washers between it and the lugs 22 and can be adjusted to ensure vertical alignment by virtue of the slots in the bridge through which the screws 23 pass. This latter is in lieu of using the plaster ears on the bridge.

The bridge will be seen to be mounted between the plate and the main portions of the wiring devices. The bridge is provided with three openings 33, each of a size to snugly receive the neck 15 of any one of the wiring devices and in each end of these openings is an extension or bay 34 to permit the passage alongside of the neck of one of the attaching spring clips 36, two of which are attached to each wiring device as shown in Figures 2 and 3. These clips are of spring material and are arranged to snap through the base 34 and to have lugs 37 which snap over the upper surface of the bridge and secure the individual units in positon therein. The lateral arms 39 of the clips are sprung between the underside of the bridge and the shoulder 30 to ensure against looseness. By squeezing the lugs toward each other they can be released from the plate for the removal of the wiring devices.

In case it is desired to use a single unit in a box and to position it with its major axis in alignment with the major axis of the wall plate the central opening 33 is crossed by a correspondingly shaped opening 38 at right angles thereto as shown in Figure 5, so that the center device can be applied either with its major axis coincident with or at right angles to that of the bridge.

In certain cases the wiring codes require that wiring units on different systems be housed in separate boxes and to provide facility for this separators 40 as shown in Figures 3, 4, and 7 are provided for insertion between the wiring devices which are made of such width as to leave spaces between them for the separator. These separators have their narrow dimension such as to fit snugly within the box as shown in Figure 4 and, to accommodate various depths of boxes, are provided of the maximum depth and equipped with weakened portions formed by the grooves 41 therein so that they can readily be broken to the proper length with facility.

For securing the separators into the bridge the longitudinal opening 38 at the center of the bridge has its corners widened or notched as at 43 and the separator 40 is provided with the reduced neck portion 44 of a width to snugly fit between the ends of the notches 43 and with the over-hanging lugs 45 to prevent longitudinal slipping. In order that the neck 44 can be slipped between the narrower sides of the opening before reaching the notches 43 it is longitudinally slotted as at 46 to provide resilience and is preferably inserted by first pressing one side of the neck into a notch 43 and then partially rotating the separator until the other side snaps into the corresponding notch. When mounted, the position will be as shown in Figure 4. The use of these devices is optional or in accordance with the requirements of the location being wired and it is obvious that when they are used separate knock-outs must be removed from the box to receive wires from the various devices but when they are not used a single knock-out may bring in the conductors for all devices if desired.

Since the most important feature of the present invention is the interchangeability of the various wiring devices as regards position and utility in the bridge or in respect to the openings in the wall plate it is obvious that the invention is not at all limited to the specific means of mounting these devices either in the bridge or in respect to the plate. For instance, in Figures 8, 9, and 10 is shown an alternative arrangement in which a bridge 50 is provided which is in most respects similar to that shown in Figure 5 but in which the openings 51 for the passages of the necks on the wiring devices are mainly rectangular and of the same size as the neck. Each opening 51, however, intersects a circular opening 51' of less diameter than the length of the major axis of the opening 51.

By careful designing, a number of the wiring devices can be made sufficiently small so that the main body portion thereof may pass through one of these openings 51 so that, in effect, the device has a neck 52 and a body portion 53 of the same size in cross-section and separated by the flange or collar 54 which is of just the thickness of the space between the upper face of the bridge and the lower face of the wall plate so that the device can be mounted with the flange resting on top of the bridge and be held in position either by some mechanical means, to be later described, or by friction until the plate is applied, after which it is clamped between the bridge and plate and permanently secured in position.

As seen in the small push button device 55 shown in Figure 9 there is a thin fin or rib 56 on the body portion 53 which is slightly mutilated when the device is being pressed into the opening in the plate and provides additional friction to ensure the device remaining in position while the bridge is mounted and the plate positioned over it.

In the case of devices such as switches, the body portions of which are too large to pass through the opening in the bridge, they are provided with the neck exactly as described in connection with the first form of the invention but instead of having the spring clips for securing them in position the body 58 is provided with two metal plates 59 partially embedded therein and having portions extending up alongside of the ends of the neck and parallel thereto which pass through slots 60 provided in the bridge adjacent to the main openings therein. Each plate 59 has the hole 61 therein connected to the upper edge by the small slot 62 and the under edges of the fingers 63 thus provided are inclined as seen in Figure 9. The spacing of the devics in the bridge is such that the inclined lower side 64 of these fingers intersects the plane of the upper face of the bridge so that if a screw driver, for instance, is placed in the slot 62 and twisted the two fingers 63 will be oppositely bent as seen in Figure 8 and the inclined under edges thereof will bind on the face of the bridge to securely lock the device in the bridge with the shoulder tightly pressed against the under surface of the bridge.

Such units as the convenience outlet 68, seen at the lower part of Figures 8 and 9, can be constructed to pass through the opening in the plate and to have the flange 54 as described in connection with the push button but if it is desired to provide more secure attachment to the bridge, for instance to transmit the pull of removing a plug thereto instead of to the wall plate, this can be done by providing the device with two of the plates 59 extending downwardly instead of upwardly, as in the case of a switch, and operated in exactly the same manner as those just described.

For use in connection with the devices of Figures 8 and 9 a separator 70 such as shown in Figure 10 is employed. It is substantially like that of Figure 7 except for the fastening means 71 which while integral with the separator are nevertheless constructed like the plate 59 shown on the switch and convenience outlet.

While it is convenient for assembly, and probably makes a mechanically superior device, the bridge is not necessary and means such as shown in Figure 11 can be provided to directly secure the individual wiring devices to the wall plate in which case they can be individually wired, attached to the wall plate and then the plate secured to the outlet box by screws engaging the ears thereon or in any desired manner. The devices 75 are interchangeable in position in the plate 76 and there may conveniently be attached to their sides the double spring members 77, the ends of which converge and snap over the headed projections 78 extending rearwardly from the wall plate. Various other mechanical expedients for attaching the devices directly to the plate will be obvious to those skilled in this art and it is not the intent to suggest even that the mechanism shown is the best but only that it is representative of a form of mechanism for securing the devices interchangeably and directly to the wall plate.

Where such an arrangement is used as shown in Figure 11 there is not the provision for adjustment of the bridge to ensure proper alignment of the wall plate so that it is vertical or horizontal, as desired, in the event that the box is not mounted truly (and it usually is not) so that resort may be had to the mechanism shown in Figures 22 and 23 to properly position the plate for the sake of appearance. Here each plate is provided with a pair of metal straps 80, each approximately one-half an inch in length and provided with a pair of holes 81, 82 respectively. The holes 81 are tapped for screws 83 which pass through the plate and are received in these tapped openings. The holes 82 are of sufficient size to clear the screws which are received in the lugs at the ends of the outlet box. In operation the straps 80 are secured to the lugs of the box and the screws are tightened only sufficiently so that the straps can be adjusted in position to be spaced properly to receive the screws from the plate. When these are loosely entered into the straps the plate is then twisted until it is vertical, after which the screws holding it to the straps may be removed, the screws securing the straps to the box tightened, and the plate repositioned and securely fastened. This device is extremely simple and yet permits of a wide range of adjustment for properly positioning the plate.

A further manner of avoiding the use of a single main bridge is suggested in Figures 12 and 13 wherein three interchangeable units of any desired type are shown mounted in the outlet box 90 wherein each unit is provided with an individual bridge or strap 91 which extends transversely of the box and has the down-turned ends 92 which may be bent inwardly toward each other slightly and are somewhat springy so that these units may be snapped over the box after they have been wired, and then adjusted in respect to each other and the ends of the box so that their necks 93 are properly received in the openings in a wall plate such as that shown in Figures 1 and 6. The plate will hold the devices in longitudinal adjustment and will when secured to the box of course hold them against the upper edges of the box so that they are fixed against movement in any direction.

Figures 14 and 15 show a further manner of mounting the wiring devices wherein a strap bridge 95 is provided of generally U-shaped configuration with the units 96 supported from the bottom thereof and attached thereto as for instance by straddling the strap 97 at the bottom of the U and having a screw 98 passing up into the device through the strap or by any other mechanical attaching means. Each of the devices has a rectangular neck 99 as described in connection with the previous forms and the only difference in the devices used with this type of bridge and those previously described is that they must be of uniform height.

In the event that it is desired to use a still further form of bridge resort may be had to the mechanism of Figures 16 and 17 wherein the neck 100 of the wiring device 101 is provided with a groove 102 at the junction of the shoulder and the neck to receive the circular rods 104 of the bridge shown in Figure 17. These two rods are spaced a proper distance apart to tightly engage the sides of the grooves by means of the end members 106, each having a pair of sockets 107 to receive the rods. The rods may be secured in the sockets of one of the end members and the other may be loosely fitted thereto so that this end member can be removed for the insertion of the desired number of wiring units after which the end member is returned to position and the bridge mounted on the box. Longitudinal spacing of the elements may be accomplished by making them of the desired width or they may be adjusted by hand so that their necks fit the openings in the wall plate.

In Figures 18 and 19 is shown a modification of Figures 16 and 17 wherein, instead of rods, channels 110 of U-shaped cross-section may be fitted between the end members 111 and have their open sides facing each other to engage around a bead 112 at the junction of the neck 113 and body 114 of the wiring device.

Another form of bridge is shown in Figure 20. This is stamped from sheet metal somewhat to the shape of the bridge of Figure 5 and provides three openings 116, for the interchangeable mounting of suitable wiring devices for instance those having grooves in their necks as shown in Figure 16. To permit these to be inserted one side 117 of the bridge is removable and is pivoted at 118 to the main portion of the body. It may be conveniently formed by folding a strip of metal so that it fits over the main portion of the bridge to receive therethrough the pivot pin 118 and the opposite end may have fingers 119 to clasp the front and back of the bridge to hold the member 117 in position. These fingers may have slight inward projections 120 thereon to be received in an opening in the bridge to form a friction lock to hold the side member in place.

A still further form of bridge is shown in Figure 21 wherein a pressed sheet metal member 122 is provided with a single large opening 123 to receive the desired number of wiring devices, for instance, of the type which pass through the opening and have a flange resting on the upper surface of the bridge and in which the spacing and securing is done by the wall plate as in connection with some of the devices of Figures 8 and 9.

It will be evident that features of certain of the embodiments can be used in conjunction with other embodiments and that various modifications can be made without departing from the main features of the invention.

Having thus described the invention, what is claimed as new and desired to be secured by Letters Patent is:

1. The combination with a single gang, multi-ported wall plate, of a wiring device for each port, and bridge means between the wall plate and the main portion of each wiring device to support said devices in proper spaced relation to said ports.

2. The combination with a single gang, multi-ported wall plate, of a plurality of wiring devices each adapted to cooperate with any port, a single bridge for all of said devices between their main portions and the wall plate, said devices when arranged on said bridge for cooperation with the plate being receivable in a single gang outlet box.

3. The combination with a single gang outlet box, of a plurality of individual wiring devices, bridge means to assemble said devices interchangeably in said box and a multi-ported wall plate closely adjacent to the whole bridge and having a port to cooperate with each of said devices in the box.

4. The combination with a single gang outlet box of a single gang wall plate having a plurality of openings therein, a plurality of individual wiring devices each having a part to cooperate with the walls of one of said openings, and bridge means carried by the box close behind the wall plate to interchangeably maintain said devices in position to cooperate with the plate.

5. For use with a single gang outlet box, in combination, a wall plate having a plurality of uniform openings therein, an individual wiring device of different character for each opening, and mounting means substantially between the wall plate and the wiring devices to secure said devices interchangeably in fixed relation to the walls of said openings.

6. For use with a single gang outlet box, in combination, a wall plate having a plurality of uniform openings therein, an individual wiring device for each opening, and mounting bridge means to cooperate with the outer portions of the wiring devices to positively and interchangeably position and space said devices in said box for cooperation with the walls of said openings.

7. For use with an outlet box of more than one gang, in combination, a correspondingly sized wall plate having more uniform openings than gangs in the box, an individual and interchangeable wiring device for each opening and a bridge means for each gang to engage the devices thereof near said plate to mount them in fixed relation to the walls of said openings.

8. The combination with a single gang outlet box and a single gang wall plate having two or more uniform openings therein, of an interchangeable electrical device at the back of the plate for each opening, each device having a part fitting into its opening, and bridge means close to the plate and secured to the box to engage said devices and fix them against rearward movement.

9. The combination with a single gang wall plate having two or more uniform openings therein, of an interchangeable wiring device at the back of the plate for each opening, each device having a neck fitting into the corresponding plate opening, a bridge behind the plate and adapted to be secured to an outlet box, said bridge having an opening corresponding to each opening in the plate, said devices interchangeably fitting said bridge openings and insertable from the rear thereof, and means to secure each device to the bridge.

10. The combination with a single gang wall plate having at least two uniform openings therethrough and a single gang outlet box, of an interchangeable wiring device at the back of the plate for each opening, a bridge secured to said box in front of the main portions of the wiring devices and interchangeably holding said devices in proper relation to said openings and means securing said devices to said bridge.

11. The combination with a single gang wall plate having at least two uniform openings therethrough and a single gang outlet box, of an interchangeable wiring device at the back of the plate for each opening and having an elongated mounting portion, a bridge secured to said box and having elongated openings to interchangeably support said devices in proper relation to said plate openings, said bridge having an opening to support one of said devices in one or the other of two positions at right angles to each other.

12. As an article of manufacture a bridge for an outlet box, said bridge having a plurality of openings therein each adapted to interchangeably receive similar portions of different wiring devices, means to receive wall plate fastening means, and means to cooperate with parts of said wiring devices to hold them immovably in the bridge.

13. The combination with a single gang wall plate having at least two uniform openings therethrough and a single gang outlet box, of an interchangeable wiring device at the back of the plate for each opening, a bridge secured to said box and interchangeably receiving said devices in proper relation to said openings, and permanently attached means on one of said parts to engage the other and hold the devices immovably on the bridge.

14. Apparatus for electric wiring comprising a bridge member for mounting across the face of an outlet box and a plurality of different wiring devices, said bridge providing mounting for a plurality of said devices interchangeable in position and function, and permanently attached interengaging means on said bridge and devices for securing them together.

15. Wiring apparatus for use in a single gang outlet box comprising a bridge member to extend longitudinally of the mouth of the box and having a plurality of uniform, spaced openings therethrough, a plurality of different wiring devices for cooperation with said bridge and each having a neck for passage through a similar opening in a wall plate, some of said devices having said neck elongated for passage also through one of said openings, certain of said devices having a body portion of a size to pass through one of said openings and means to secure said devices interchangeably in said bridge.

In testimony whereof I hereunto affix my signature.

VICTOR R. DESPARD.